INVENTOR.
TOMMY J. McCUISTION
BY
Milburn Milburn
ATTORNEYS

Patented Aug. 4, 1953

2,647,810

UNITED STATES PATENT OFFICE 2,647,810

SEALING ASSEMBLY

Tommy J. McCuistion, Euclid, Ohio, assignor to Precision Rubber Products Corporation, Dayton, Ohio, a corporation of Ohio Application October 24, 1950, Serial No. 191,836

1 Claim. (Cl. 309—23)

This invention relates to an improved floating seal which belongs to the general class of packings and which may be employed in assemblies with either reciprocatory or rotary motion between the elements to be sealed.

As is well known to those who are familiar with the art to which this invention relates, there has been experienced considerable difficulty because of wear of the sealing element due to friction and/or over-heating and consequently there has been experienced considerable leakage past the sealing element.

Therefore one object of my present invention is to devise a sealing combination in which the ring itself is subjected to less friction, less heat and hence less wear when in operative assembly between the elements which it is supposed to seal.

Another object is to devise such a sealing assembly in which danger of leakage between the elements, which are intended to be sealed, is reduced to practically nil.

Another object is to devise such a sealing assembly which may be depended upon for sealing effect under conditions of either higher or lower temperature than is now possible with other such assemblies.

Another object is to devise such a sealing assembly which may be employed under various conditions and for various purposes which it has not been possible to satisfy or to serve with other known sealing combinations to date.

Another object is to devise such a sealing assembly which may be employed with these same beneficial results in the case of either relative reciprocatory or rotary motion between the elements which are intended to be sealed.

Another object is to devise a sealing assembly in which the sealing ring is subjected to the same general pressure conditions upon opposite sides axially thereof and in which there is precluded any danger of passage of fluid past the rear of the sealing ring.

Another object is to devise such a sealing assembly in which the sealing ring is free to be forced towards the outer far corner of the mouth of the groove in which the sealing ring is located and in which there is precluded any danger of passage of the fluid past the rear side of the sealing ring.

Other objects will appear from the following description and claim when considered together with the accompanying drawing.

It is to be understood that the present form of disclosure is merely for the purpose of illustration and that there might be devised various modifications thereof without departing from the spirit of my invention as herein set forth and claimed.

Of course, as is well known, it has been common practice for many years to employ a sealing ring of elastic material in the groove of a piston so as to have compressible engagement with the wall of the cylinder and the bottom of the groove, or to have the sealing ring positioned in like manner within a groove of a stationary casing for sealing engagement about a rotating or reciprocating shaft. That is to say, in such combinations it has been the usual practice to provide a sealing ring member of such diameter and the groove of such depth that both the inner and outer radial surfaces of the ring will be compressibly engaged between the bottom of the groove and the wall of the other element of the combination. An instance of a sealing ring under compression radially between the two elements, is found in the patent to Christiansen, No. 2,180,795, November 21, 1939.

One distinguishing characteristic of my present invention resides in the fact that the sealing ring herein is entirely free of engagement with the bottom of the groove, whether this groove be provided in a reciprocating piston or in the casing of a rotary or reciprocating shaft combination. In the present illustration I have indicated the manner of employing my present invention in connection with a reciprocating piston but it is to be understood that this invention may be employed also in connection with either a rotating or reciprocating shaft.

Figure 1:
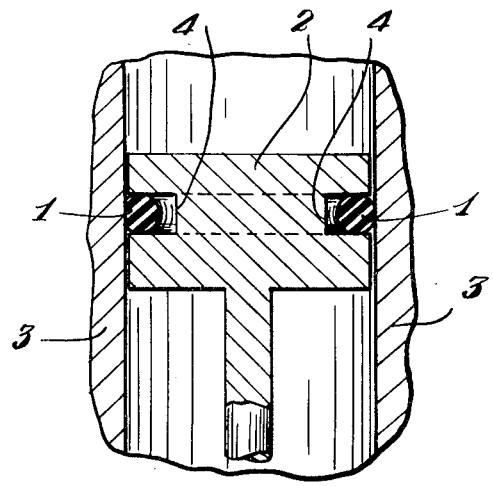
Fig. 1 is a sectional view illustrating my present sealing assembly in connection with a piston.
Figure 3:
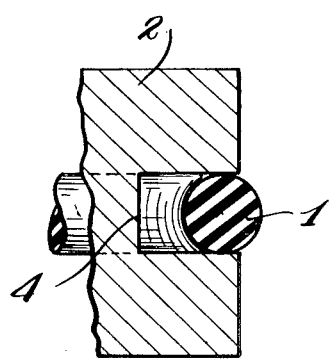
Fig. 3 is a sectional view illustrating the oversize of the sealing ring, with respect to the diameter of the piston, so as to ensure the manner of engagement of the ring with the cylinder wall, as indicated in Fig. 2 hereof.
Figure 2:
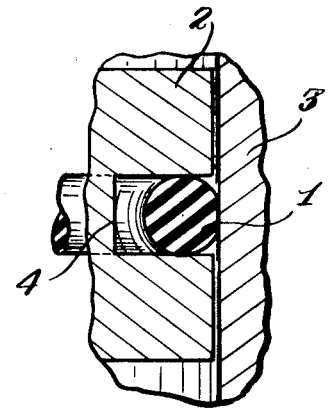
Fig. 2 is an enlarged view of a part of the assembly shown in Fig. 1 so as to illustrate more clearly the manner of engagement of the sealing ring with the cylinder wall.

Referring now to the accompanying drawing in detail, the closed sealing ring 1 of resilient elastic composition, such as rubber for instance, is here shown as being of circular cross section although this is not absolutely necessary as it may be of other cross sections, as for instance oval-shape. This ring is intended to be located within the groove of the piston 2 which is adapted for reciprocatory movement within the cylinder 3. When employed in connection with a piston, the sealing ring 1 will be made of greater outside diameter than the inside diameter of the cylinder so that it is necessary to flatten the outer tangential region of the ring against the cylinder wall upon assembling the same in the sealing engagement, as indicated in Figs. 1 and 2 of the drawings. When employed in connection with a rotary or reciprocating shaft combination, the sealing ring would have its inner diameter correspondingly less than the diameter of the shaft so as to have its tangential region in resilient flattened sealing engagement with the shaft, as will no doubt be readily understood.

As clearly indicated in the present drawing, the groove is of such depth that the sealing ring 1, when in complete assembly, is entirely free of contact with the bottom wall 4 of the groove. The width of the groove may be substantially the same as the axial diameter of the sealing ring 1 so that, when the ring is in assembly, the side walls of the groove will be engaged by the corresponding surfaces of the sealing ring with only very little if any compression of the ring in these regions.

Figure 4:
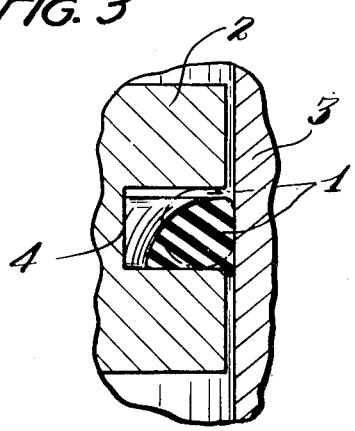
Fig. 4 is a partial sectional view illustrating the manner in which the sealing engagement of the ring is effected by the force of the fluid axially between the piston and cylinder.
Figure 5:
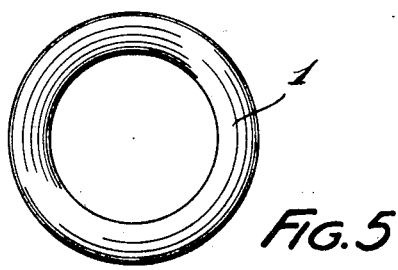
Fig. 5 illustrates one form of sealing ring which may be employed in my present assembly.

There is of course the regular clearance between the piston and the cylinder wall or between the shaft and bearing and, as the sealing ring is subjected to the fluid pressure which is transmitted axially of the piston or bearing, the sealing ring will be caused by such pressure to assume a form approximating that indicated in Fig. 4 hereof depending upon the degree of pressure, among other things, with the result that the sealing ring will be flowed by such pressure towards and slightly into the clearance between the piston and the cylinder wall at the far side of the mouth of the piston groove so as to ensure perfect sealing between these two members. This same action will take place when the piston is moved in the opposite direction except that the sealing ring will be forced in the opposite direction towards and partially into the corner at the other side of the mouth of the piston groove. In this way there is obtained a perfect sealing engagement between the piston and cylinder; and, also, the effect of this alternate compression of the sealing ring in opposite directions is to maintain the same in live condition so as to ensure most dependable functioning of the same.

By providing the groove of such depth that the sealing ring does not at any time engage the bottom of this groove, the sealing action just described is permitted in the most effective manner and with exceptionally little resistance by friction between the ring and the moving surface opposite the bottom of the groove. Since, with my present arrangement, there is avoided any and all engagement of the sealing ring with the bottom of the piston groove, for example, my sealing ring is not subjected to the wear which must necessarily follow in other installations in which the sealing ring has compression between the bottom wall of the piston groove and the cylinder wall and is subjected to the effect of the relative movement between these surfaces during operation. Thus, in my present form and arrangement of parts, there is realized a substantial reduction in the factor of friction to which the sealing ring may be subjected and, accordingly, there is no hindrance to the sealing action of the ring as just described and there is less wear upon the ring with the result that the life of the sealing ring is correspondingly prolonged as compared with other assemblies. Also, the reduction in friction means a reduction in the heat developed in my present assembly especially in rotary shaft applications and, as a result, my present assembly may ensure dependable sealing effect under a wider range of prevailing temperature, higher or lower, than is possible with other assemblies; this difference being due to the fact that, with my present organization as herein described, the factor of temperature may remain more of a constant than in other assemblies in which the developed temperature is more of a variable according to the degree of friction between the sealing element and the other elements between which it is arranged. Further, by virtue of the fact that in my present arrangement the ring is not compressed against the bottom of the groove, as in other devices, there is allowed in my present device a greater radial compression or tension upon the ring at the surface opposite the bottom of the groove without a corresponding increase in friction and wear; and the coefficient of expansion of the rubber or rubber-like material in relation to the materials of the other parts of the assembly is not such a critical factor in determining whether or not the seal performs satisfactorily. Also, in my present invention the compression set of the rubber or rubber-like material of the sealing element is not so much of a factor as in the case of other assemblies of the same general character.

A further advantage resides in the fact that my present invention reduces leakage to practically nil, this being due to the reduction in the groove width as compared with other assemblies and also because of other factors herein indicated.

Also, due to the fact that the sealing ring in my present assembly is not subjected to radial compression throughout its entire diameter, as in other devices in which the sealing element is compressed between the cylinder wall and the bottom of the piston groove, for instance, there is less danger of the sealing ring becoming set and there is likewise less danger of the ring breaking and leaking. That is to say, my sealing ring is sufficiently free so as to preserve the natural constituency and resiliency and elasticity of the rubber or rubber-like material of which the ring is composed and yet it is not so free within the groove as to permit certain objectionable movement of the same within the groove during operation of the device. For instance, my present arrangement of the sealing ring within the groove precludes the danger of "snaking" since my ring may slightly engage the side walls of the groove and hence is not subjected to any appreciable axial motion with respect thereto; and hence, in my present arrangement, there can be no "bunching" of the sealing ring with the resultant leakage which occurs in other assemblies because of this objectionable condition. Thus I have made suitable provision for holding my sealing ring in effective operative assembly so as to permit sufficient freedom of movement of the ring to produce the most effective sealing between the members at all times and under all conditions and yet without the sealing ring being subjected to such compression as would produce inordinate friction and resistance to sealing action of the ring and as would produce inordinate heat, wear and resultant leakage or any of the objectionable conditions as above mentioned.

Also, the absence of compression upon the sealing ring by the bottom of the groove and the opposite surface, makes it possible for my sealing ring to be passed over certain types of ports without causing any damage to the sealing ring since it is capable of sufficient freedom of movement to accommodate itself to such conditions.

Since my sealing ring does not have engagement with the bottom of the groove, it is apparent that the consideration of the exact depth of this groove with respect to the ring is altogether obviated and hence there is eliminated this factor which has proved to be of quite a critical nature in other assemblies in which there is compression of the sealing ring between the bottom of the groove and the wall opposite thereto.

As indicated in the present drawing and as contemplated by my present invention, both of the opposite side walls of the piston groove, for example, extend radially in parallel relation to each other and are of plain continuous uninterrupted form and the side and bottom walls of the groove are imperforate so as to ensure the same action at all times whether the movable element moves in the one direction or the other and also to avoid any danger of by-passing of the pressure of the fluid from the one side of the sealing ring to the other side thereof, that is past the rear of the ring. To explain further, the present invention is designed and intended for installation where there is contemplated a two-way action such as is typified in the case of a reciprocatory piston and in which there is the same action in both directions. Likewise in the case of a rotating or reciprocating shaft, it is contemplated that there will be the same uniform sealing effect upon both sides of the same at all times and under all conditions, that is upon both sides of the sealing element. This is possible since the condition of the groove is the same upon both sides of the sealing ring and there is nothing to hinder the full and uniform desired sealing effect upon both sides of the ring as herein contemplated.

It is to be understood that practically all of the above-mentioned advantages of my present invention are present in the case of a rotating shaft as well as in the case of a reciprocating piston or shaft insofar as applicable to the particular existing conditions; and that the following claim is to be interpreted accordingly.

What I claim is:

In a fluid pressure sealing device, a pair of elements movable relatively to each other, one of said elements having a packing groove with straight sides, and a resilient elastic one-piece composition packing ring of uniform consistency throughout having a convex curved outer surface positioned in said groove for operative engagement between said elements and having the tangential region of the curved surface thereof diametrically opposite the bottom of said groove in radially compressive circumferentially restricted flattened resilient sealing engagement with the other of said elements, the depth of said groove being greater than the corresponding dimension of said ring so that there will be a clearance at all times between the bottom of said groove and said ring when in assembly, said ring being adapted to be pivoted by initial axial fluid pressure between said elements about its restricted tangential engagement so as to bring the curved surface of said ring into initial tangential sealing engagement with the opposite straight wall of said groove and to be forced by continued axial fluid pressure between said elements into the opposite corner between the side wall of said groove and the other of said elements.

TOMMY J. McCUISTION.

References Cited in the file of this patent

UNITED STATES PATENTS

| Number | Name | Date |
|---|---|---|
| 2,314,683 | Berry | Mar. 23, 1943 |
| 2,386,873 | Mercier | Oct. 16, 1945 |

FOREIGN PATENTS

| Number | Country | Date |
|---|---|---|
| 177,010 | Switzerland | Aug. 1, 1935 |
| 974,009 | France | Sept. 20, 1950 |